United States Patent [19]

He et al.

[11] Patent Number: 5,591,482

[45] Date of Patent: Jan. 7, 1997

[54] CONDUCTIVE POLYURETHANE FOAM AND ITS MANUFACTURE

[75] Inventors: Fei-feng He, Shangahi, China; Toshihiro Yamamoto; Miwako Yamamoto, both of Kanagawa, Japan

[73] Assignee: Inoac Corporation, Nagoya, Japan

[21] Appl. No.: 197,983

[22] Filed: Feb. 17, 1994

[30] Foreign Application Priority Data

Feb. 17, 1993 [JP] Japan .................................. 5-051391
Jun. 23, 1993 [JP] Japan .................................. 5-176190

[51] Int. Cl.$^6$ .............................. B05D 5/12; B05D 3/00
[52] U.S. Cl. .................. 427/244; 427/255.6; 427/296; 427/301; 427/316; 427/352
[58] Field of Search .................. 427/244, 255.6, 427/296, 301, 316, 352, 322

[56] References Cited

U.S. PATENT DOCUMENTS

| | | | |
|---|---|---|---|
| 4,071,474 | 1/1978 | Kishimoto | 252/500 |
| 4,252,878 | 2/1981 | Lazarz et al. | 427/58 |
| 4,595,706 | 6/1986 | Milligan et al. | 521/53 |
| 4,606,944 | 8/1986 | Lauchenauer | 427/296 |
| 4,636,430 | 1/1987 | Moehwald | 428/304.4 |
| 4,697,000 | 9/1987 | Witucki et al. | 427/121 |
| 4,710,400 | 12/1987 | Gardini et al. | 427/121 |
| 4,731,311 | 3/1988 | Suzuki et al. | 429/213 |
| 4,847,115 | 7/1989 | Warren et al. | 427/301 |
| 4,900,972 | 2/1990 | Wersing et al. | 310/364 |
| 5,306,447 | 4/1994 | Marcus et al. | 427/301 |
| 5,431,998 | 7/1995 | Wettermark et al. | 428/310.5 |

FOREIGN PATENT DOCUMENTS

| | | |
|---|---|---|
| 61-218643 | 9/1986 | Japan . |
| 62-84115 | 4/1987 | Japan . |
| 63-128034 | 5/1988 | Japan . |
| 1-134805 | 5/1989 | Japan . |
| 4-1241 | 1/1992 | Japan . |

Primary Examiner—Diana Dudash
Attorney, Agent, or Firm—Finnegan, Henderson, Farabow, Garrett & Dunner, L.L.P.

[57] ABSTRACT

A method of manufacturing a conductive polyurethane foam in which the polymerization is made easy, the refinement of pyrrole or the like is not required, the recovery rate of a solvent is enhanced, and the pre-treatment is not required at all; and a conductive polyurethane foam having excellent performances. This method includes a process: of coating an oxidizer solution (methanol solution containing $FeCl_3$ and $FeCl_2$) on surfaces of cells of a soft polyurethane foam; a process of perfectly removing the solvent of the oxidizer solution by vacuum drying; a process of polymerizing a compound (pyrrole or the like) with conjugated double bonds on the surfaces of cells of the continuous forming type polyurethane foam after being coated with the oxidizer in a vapor-phase atmosphere for forming a conductive electronic conjugated polymer layer (polypyrrole layer or the like) of the compound on the surfaces of the cells; a process of dipping the polyurethane foam formed with the polymer layer in a solvent for extracting the pyrrole and the oxide; and a process for vacuum-drying it. A conductive polyurethane foam can be continuously manufactured by this process. The conductive polyurethane foam thus manufactured has an electric conductivity ranging from $10^{-7}$ to $10^{-2}$ S/cm.

14 Claims, 2 Drawing Sheets ns. However, the conductive polymer is generally infusible and insoluble, and has a problem in workability. Further, the finished configuration of the polymer is limited to a film or powder state and the mechanical strength thereof is not strong so much. Consequently, the conductive polymer has been used as a complex material with a polymer base material excellent in workability and mechanical strength.

CONDUCTIVE POLYURETHANE FOAM AND ITS MANUFACTURE

BACKGROUND OF THE INVENTION

1. Field of the Invention

The present invention relates to a conductive polyurethane foam and its manufacture, and particularly to a conductive continuous foaming type polyurethane foam in which the surfaces of cells are covered with a pyrrole compound polymer and its manufacture, and further, to a method of continuously manufacturing a long-sized conductive continuous foaming type polyurethane foam sheet.

The present invention is applicable for antistatic fillers in the electronic and electric fields, antistatic cushioning materials for transport packages, sponge rolls for removing electrostatic charge, pressure sensors, pressure switches and the like.

2. Description of the Related Art

In recent years, conductive polymers such as polyacetylene have been synthesized. First of all, polymers of complex five-membered ring compounds such as pyrrole compounds have been focused in terms of electric conductivity and stability. The polymerizing method for the above-described polymers includes chemical solution polymerization, electrolytic chemical polymerization and interfacial polymerization. However, the conductive polymer is generally infusible and insoluble, and has a problem in workability. Further, the finished configuration of the polymer is limited to a film or powder state and the mechanical strength thereof is not strong so much. Consequently, the conductive polymer has been used as a complex material with a polymer base material excellent in workability and mechanical strength.

As techniques of manufacturing a conductive polyurethane foam complex, there have been known (1) an impregnation method (chemical solution polymerization) (Japanese Laid-open Nos. HEI 4-1241 and SHO 63-128034); and (2) a combination of the impregnation method and an electrolytic chemical polymerization method (Japanese Laid-open No. SHO 61-218643).

Further, there has been known a vapor phase method of forming a conductive polymer layer on a porous base material other than a polyurethane foam by vapor phase polymerization (Japanese Laid-open Nos. SHO 62-84115 and HEI 1-134805).

In the conventional impregnation method, since a base material is first impregnated in an oxidizer solution and subsequently dipped in a pyrrole solution, part of an oxidizer is added into the pyrrole solution so that pyrrole is naturally polymerized, to reduce the utilization factor of the pyrrole. Pyrrole generally contains an anti-oxidation agent, and thereby it must be refined before being used. The pyrrole thus refined is limited in its preservation period. Further, the interior of each cell of a polyurethane foam is almost filled with the pyrrole solution, and polypyrrole tends to grow in a massive state irrespective of the adhesion with the cell skeleton in the cell, which permits the polypyrrole from being easily fallen from the cell, thus exerting adverse effect as conductive impurities and dusts.

The above-described electrolytic chemical polymerization method is not suitable for the mass-production because the magnitude of a compound material is dependent on the electrode used. Further, the above-described vapor-phase polymerization method does not exemplify any polyurethane foam as the base material, and does not intend to obtain the sufficient solvent recovery.

SUMMARY OF THE INVENTION

To solve the above problems, the present invention has been made, and an object of the present invention is to provide a method of manufacturing a conductive polyurethane foam in which the polymerization is made easy, the refinement of pyrrole is not required, the recovery rate of a solvent is enhanced, and the pre-treatment is not required at all; a method of continuously manufacturing a conductive polyurethane foam sheet on a large scale; and a conductive polyurethane foam having practical physical properties.

A method of manufacturing a conductive polyurethane foam according to the present invention includes the steps of: coating an oxidizer solution on the surfaces of cells of a continuous foaming type polyurethane foam, and then perfectly removing the solvent of the oxidizer solution by vacuum drying; polymerizing a compound having conjugated double bonds on the surfaces of the cells of the continuous foaming type polyurethane foam thus stuck with the oxidizer in a vapor phase atmosphere for forming a conductive electronic conjugated polymer layer of the compound on the surfaces of the cells; dipping it in a solvent for extracting the untreated portion of the compound and the oxide; and drying it in vacuum.

In another method of continuously manufacturing a conductive polyurethane foam according to the present invention, the following processes are made in sequence while a long-sized continuous foaming type polyurethane foam sheet is carried. The above processes includes: a process of coating an oxidizer solution on the surfaces of cells of a polyurethane foam sheet; a process of perfectly removing the solvent of the oxidizer solution by vacuum drying the polyurethane foam sheet stuck with the oxidizer solution; a process of polymerizing a compound having conjugated double bonds on the surfaces of the cells of the continuous foaming type polyurethane foam sheet thus stuck with the oxidizer in a vapor phase atmosphere for forming a conductive electronic conjugated polymer layer of the compound on the surfaces of the cells; a process of dipping it in a solvent for extracting the untreated portion of the compound and the oxide; and a process of removing the solvent by vacuum drying it.

In this manufacturing method, the following processes are performed while a long-sized continuous foaming type polyurethane foam sheet (untreated sheet) 2 is continuously carried by use of rollers shown in FIG. 1. First, the polyurethane foam sheet 2 is dipped in a solution vessel 3 containing an oxidizer solution F and is coated on the surfaces of cells with the oxidizer solution. After that, the polyurethane foam sheet thus coated is introduced in a vacuum drying apparatus 4 to be dried in vacuum. Thus the solvent of the oxidizing solution is perfectly removed. Subsequently, a compound P with conjugated double bonds is introduced in a reaction vessel 5, and simultaneously the above sheet is continuously carried in the reaction vessel 5. Thus the compound P is polymerized on the surface of the cells of the polyurethane foam sheet stuck with the oxidizer, to form a conductive electronic conjugated polymer of the above compound on the surface of the cells. After that, the resultant sheet is continuously dipped in a solvent S contained in a solvent vessel 6, to extract the above untreated compound P and the above oxide. Then, this is introduced in a vacuum drying vessel 7, to remove the above solvent, thus continuously manufacturing the conductive polyurethane foam sheet 1a. After that, as needed, it is cut-in or cut-off in a specified size, to obtain the final product shape.

The conductive polyurethane foam is composed of a continuous foaming type polyurethane foam; and a conductive electronic conjugated polymer layer formed by vapor polymerization of a compound with conjugated double bonds on the surfaces of cells of the continuous foaming type polyurethane foam, wherein the electric conductivity is in a range from $10^{-7}$ to $10^{-2}$ S/cm.

According to the manufacturing method of the present invention, since pyrrole or the like is polymerized in vacuum on the surfaces of cells stuck with an oxidizer, a gas of pyrrole or the like is deposited on the surfaces of cells of the polyurethane foam to form a conductive film excellent in homogeneity and adhesiveness. Namely, since a polypyrrole is not allowed to be aggregated irrespective of the cell skeleton as in the impregnation method, it is not easily fallen from the cells. Accordingly, the manufacturing method of the present invention is extremely suitable for making conductive the base material having the cell skeleton structure such as the polyurethane foam. Further, since the oxidizer solution is first stuck and thereafter the solvent is perfectly removed by vacuum drying, the oxidizer is excellent in the adhesiveness with the surfaces of cells, thus making it possible to form a conductive film excellent in the adhesiveness, and to enhance the recovery rate of the solvent. Further, since the pyrrole or the like is not directly contacted with the oxidizer solution as in the dipping method, it is possible to reduce the loss in the pyrrole or the like.

Further, depending on the content of the oxidizer, polymerizing reaction time, and reaction temperature, it is possible to freely adjust the electric conductivity of the conductive polyurethane foam.

In the case that the conductive polyurethane foam sheet is continuously manufactured in the sequential processes while a long-sized continuous foaming type polyurethane foam sheet, the sheet-like conductive polyurethane foam can be effectively manufactured, which is extremely suitable for the mass-production.

Further, in the case that $FeCl_3$ is used as the oxidizer and $FeCl_2$ is not added, the oxidizing reaction is high in the initial stage of the reaction; but it is relatively rapidly reduced because $FeCl_2$ is produced along with the progress of the oxidation. On the contrary, in the case that $FeCl_2$ is previously added to $FeCl_3$, the oxidizing action in the initial stage of the reaction is slightly reduced; but the subsequent reduction is small, as a result of which a constant oxidizing potential is substantially kept throughout the whole reaction process in average, which makes it possible to form a film excellent in electric conductivity.

According to the manufacturing method of the present invention, it is possible to easily manufacture a conductive complex foam capable of keeping the physical properties of a foam prior to formation of a conductive film, without refinement of pyrrole, and to perfectly recover the solvent.

According to the manufacturing method in which a long-sized continuous foaming type polyurethane foam sheet is carried, it is possible to continuously manufacture a sheet-like conductive polyurethane foam, which is extremely suitable for the mass production. Further, by the addition of $FeCl_3$ to $FeCl_2$ as an oxidizer, it is possible to manufacture a conductive polyurethane foam having further excellent electric conductivity and physical properties.

DETAILED DESCRIPTION OF THE PREFERRED EMBODIMENTS

Figure 1:
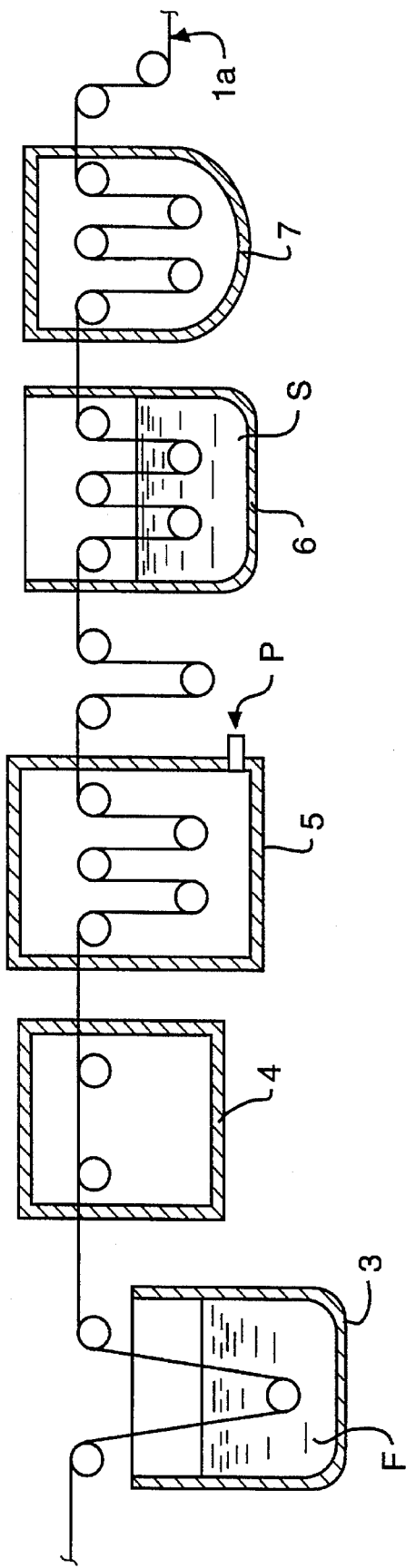
FIG. 1 is a typical view showing a method of continuously manufacturing a sheet-like conductive polyurethane foam.

In the present invention, the above-described "continuous foaming type polyurethane foam" as a base material is a molded product (sheet, plate, and others) in which a plurality of foams, that is, pores are continuous to each other (in other words, a plurality of cells are connected to each other). Preferably, it includes a soft polyether based foaming body having an open cell structure.

The above-described "oxidizer" may be of a type having an activity against the polymerization of a "compound with conjugated double bonds" (hereinafter, referred to as "polymerizable compound"). It includes the known iron (III) salt [$FeCl_3$, $Fe(ClO_4)_3$, $Fe(BF_4)_3$ and $Fe_2(SiF_6)_3$], copper (II) salt, ruthenium (III) salt, molybdenum (V) salt, tungsten (VI) salt, manganese (VII) salt, and the like. Among others, $FeCl_3$ and $Fe(ClO_4)_3$ are preferably used.

As the "oxidizer solution", there may be used a solution in which $FeCl_2$ is dissolved together with $FeCl_3$ in the "solvent". The mole fraction of $FeCl_2$ to $FeCl_3$ is in the range of 0.01–1.0, preferably, in the range of 0.05–0.5. In the case that $FeCl_2$ is added to $FeCl_3$, the initial polymerizing reaction rate of a compound can be suppressed and the electric conductivity of a polyurethane foam can be enhanced, as compared with the case of using only $FeCl_3$. When the mole fraction is less than 0.01, the above effect of suppressing the reaction rate is low; whereas when it is more than 1.0., $FeCl_3$ and $FeCl_2$ tend to be undesirably precipitated in the solution.

An oxidizer to be coated on the surfaces of cells of a polyurethane foam is in the range of 20–160 parts by weight, preferably, in the range of 70–160 parts by weight on the basis of 100 parts by weight of the polyurethane foam used. When the amount of the oxidizer is less than 20 parts by weight, the electric conductivity of the polyurethane foam is low; whereas when it is more than 160 parts by weight, the residual oxidizer not contributing to the oxidizing reaction or the rest of the oxidizer after reaction is taken in the polyurethane foam, which occasionally reduces the physical properties.

The oxidizer coated on the surfaces of cells of a polyurethane foam is qualified by subtracting the weight of the polyurethane foam before being coated with the oxidizer from the weight of the polyurethane foam after being coated with the oxidizer solution and perfectly removed with a solvent by vacuum drying.

The above-described "solvent" is an organic solvent being excellent in affinity against a polyurethane foam sheet, and having a property of dissolving only the oxidizer while not dissolving the polyurethane foam. It includes methanol, ethanol and isopropyl-alcohol and the like. Among others, methanol or ethanol being a solvent having a low boiling point is preferably used. The concentration of the oxidizer solution is in the range of 5–30 wt %, preferably, in the range of 10–20 wt %.

As the above-described "polymerizable compound", there may be used complex five-membered ring compounds (single ring non-substitutional compound, single ring substitutional derivative, and compound with a plurality of five-membered rings joined to each other and its substitutional derivative) such as a pyrrole system and thiophene system. Preferably, a pyrrole compound (pyrrole, pyrrole derivative, 2, 2-bipyrrole, and 2, 2-bipyrrole derivative) are used. Further, a pyrrole compound having a pyrrole ring skeleton structure without substituent at 2, 5 positions is most preferably used, which includes pyrrole, N-methylpyrrole, N-ethylpyrrole, N-phenylpyrrole, 3, 5-dimethylpyrrole, 3-methoxypyrrole, 3-methyl-N-methylpyrrole and the like.

The above-described vapor polymerization may be performed under normal pressure or reduced pressure. The reaction temperature is preferably in the range of 0–80° C. It is usually performed at room temperature.

In the conductive polyurethane foam of the present invention, the reason why the electric conductivity is specified as described above is that the electric conductivity in the above range can be actually obtained according to the manufacturing method of the present invention; and that the electric conductivity less than $10^{-7}$ S/cm is insufficient.

Even in the conductive polyurethane foam of the other invention, a pyrrole compound as described above can be used as a compound with conjugated double bonds. Further, this conductive polyurethane foam can be made in a long-sized conductive polyurethane foam in the form of a continuous conductive film.

EXAMPLES

Hereinafter, the present invention will be more fully described by way of examples.

(1) Test 1 (pyrrole is used as a polymerizable compound, and $FeCl_3$ is used as an oxidizer)

EXAMPLE 1

In this example, each conductive film was formed on a soft polyurethane foam while the polymerization time was changed.

First, a polyether based polyurethane foam [trade name; "CF-40", sold by INOAC CORPORATION] having physical properties shown in Table 1 was cut in a size of 50×50×5 mm (5 mm: thickness). The sample was dipped in a methanol solution containing $FeCl_3$ (12 wt %). This was then removed from the solution, and was dried in vacuum (degree of vacuum; 100 mmHg, 25° C., and 4 hr), so that the methanol was perfectly removed to be recovered.

Figure 2:
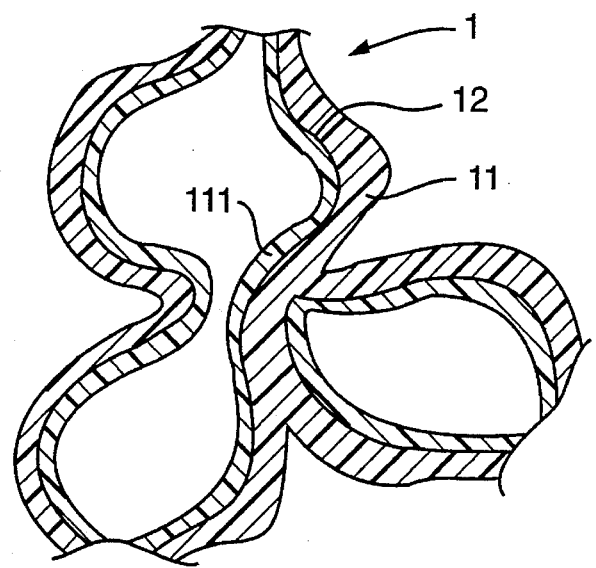
FIG. 2 is a typical sectional view showing a complex foam manufactured in examples.

Subsequently, the polyurethane foam stuck with the oxidizer was put in a reaction vessel, to which a pyrrole gas was introduced. Thus, the polyurethane foam was exposed to the pyrrole gas at 20° C. in the reaction vessel for a specified time shown in Table 1. After that, the sample was subjected to methanol cleaning by five times, to extract the oxidizer from the film. This was then dried in vacuum (degree of vacuum; 100 mmHg, 25° C., and 4 hr) to remove the solvent, thus manufacturing a complex foam 1 in which a conductive polymer layer 12 was formed on the surfaces of cells 111 of a polyurethane foam portion 11 as shown in FIG. 2.

The electric conductivity of each complex foam was measured by a four-terminal method, which gave the results shown in Table 1.

As is apparent from these results, it is revealed that the complex foams having various conductivities can be manufactured by changing the reaction time.

EXAMPLE 2

In this example, each conductive film was formed by changing the reaction temperature.

Each complex foam was manufactured in the same manner as in Example 1 at the reaction temperature shown in Table 2. As is apparent from the results, it is revealed that, as the reaction temperature is low, the electric conductivity of the polyurethane foam is large irrespective of small produced amount of polypyrrole. This is because a homogeneous film is formed when the polymerization is performed at low temperatures

TABLE 1

| Sample No. 0. | 1 | 2 | 3 | 4 |
|---|---|---|---|---|
| Polymerization reaction n time (hr) | 0.5 | 1.0 | 4.0 | 24 |
| Electric conductivity σ (S/cm) × $10^{-4}$ | 3.00 | 6.32 | 13.7 | 33.0 |

TABLE 2

| | Reaction temperature | | | | |
|---|---|---|---|---|---|
| | 0° C. | 5° C. | 10° C. | 20° C. | 30° C. |
| Electric conductivity σ (S/cm) | 0.0098 | 0.00252 | 0.00153 | 0.00101 | 0.000897 |
| Polypyrrole produced amount (wt %) (percentage based on PU foam) | 9.2 | 10.2 | 12.6 | 26.5 | 39.6 |

Namely, when the polymerization is performed at temperatures of 0–10° C., the electric conductivity is 1.51–9.7 times as much as that obtained in the case that the polymerization is performed at 20° C., and the produced amount of polypyrrole is reduced to be in the range of 35–47.5%, as a result of which the polymerization is suitably performed as the reaction temperature is low.

EXAMPLE 3

In this example, each complex polyurethane foam was manufactured in the same manner as in Example 1, except that the thickness of the polyurethane foam used in Example 1 was 10 mm, the reaction temperature was 25° C. and the reaction time was 48 hrs.

The physical properties of the polyurethane foam before the conductive film is formed, and the physical properties of the complex foam after reaction are shown in Table 3. As the physical properties measured, there are used density, indentation load deflection, tensile strength, elongation percentage, air permeability, thermal conductivity and electric conductivity. The testing methods for these physical properties are according to the specifications of JIS and ASTM: indentation load deflection (JIS K6401); tensile strength (JIS K6402); elongation percentage (JIS K6402); air permeability (ASTM D 1564); and thermal conductivity (ASTM C-518). Further, the electric conductivity was measured in the same method as described above (four-terminal method).

As is apparent from the results, it is revealed that the elongation percentage is reduced; but the other physical properties (except the electric conductivity) are substantially the same as those before film is formed. This shows that the physical properties of the polyurethane foam is little obstructed by the formation of the conductive film. In addition, the electric conductivity can be largely improved. Further, after the solvent of the oxidizer solution is perfectly removed, the vapor polymerization of pyrrole is made, so that the recovery rate of the solvent is excellent, and also the oxidizer solution does not coexist with the pyrrole. Accordingly, it is possible to repeatedly use the coating the oxidizing agent solution and the supply of the pyrrole with no trouble.

Figure 3:
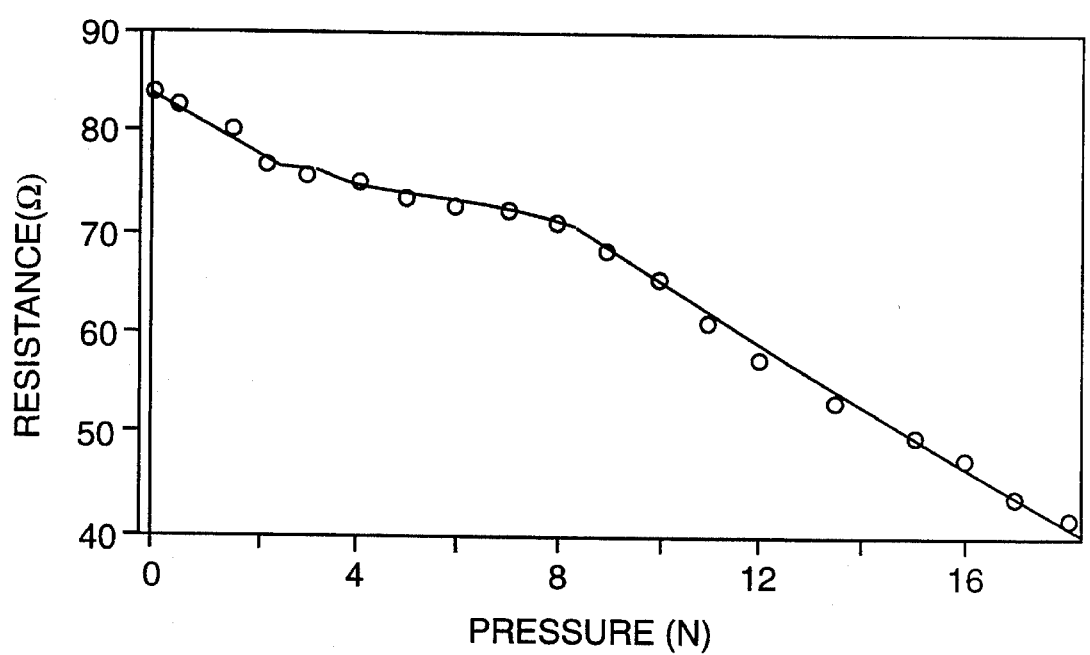
FIG. 3 is a graph showing the relationship between pressure and resistance in a complex foam according to Example 3.

Further, the complex foam was cut in a size of 50×50×20 mm, and this sample was held between double-sided metal plates, and was measured for the resistance under each pressure shown in FIG. 3, which gave the results shown in FIG. 3. As is apparent from this figure, the pressure is substantially in the linear relationship to the resistance. Further, since the soft polyurethane foam is used, the complex foam can be used for a pressure sensor, pressure switch and the like.

TABLE 3

| Physical properties | Complex foam | PU foam |
| --- | --- | --- |
| Density (kg/m$^3$) | 25 | 24 |
| Identification load deflection (25%) (kg) | 7.0 | 6.4 |
| Tensile strength (kg/cm$^2$) | 1.31 | 1.41 |
| Elongation (96) | 294 | 463 |
| Air permeability (l/min) | 230 | 231 |
| Thermal conductivity (kcal/mhr °C.) | 0.0317 | 0.0358 |
| Electric conductivity (S/cm) | 6.6~8.7 × 10$^4$ | <10$^{-9}$ |
| (resistivity Ω cm) | (1.15~ 1.5 × 10$^3$) | (>10$^9$) |

TABLE 4

| Sample No. | 1 | 2 | 3 | 4 |
| --- | --- | --- | --- | --- |
| Polymerizing reaction time (hr) | 4 | 6 | 8 | 24 |
| Electric conductivity σ (S/cm) × 10$^{-3}$ | 6 | 6.9 | 9.5 | 21.7 |

$FeCl_3$ coated amount = 80 wt % $FeCl_2/FeCl_3$ (mole fraction) = 0.286. Temperature = 20° C.

(2) Test 2 (pyrrole is used as a polymerizable compound, and $FeCl_3$ and $FeCl_2$ is used as an oxidizer)

EXAMPLE 4

Each complex foam was manufactured in the same manner as in Example 1, except that $FeCl_2$ in an amount 0.286 mole fraction was added to $FeCl_3$ in a methanol solution containing $FeCl_3$ (12 wt %), and was measured for the electric conductivity in the same manner as in Example 1. Additionally, in this example, $FeCl_3$ coated on the surfaces of cells of the polyurethane foam was in an amount of 80 parts by weight on the basis of 100 parts by weight of the polyurethane foam before being coated with $FeCl_3$.

In this example, the conductive film was formed by changing the reaction time as shown in Table 4. As a result, as in Example 1, by changing the reaction time, the complex foams with various electric conductivities were manufactured.

EXAMPLE 5

Each complex foam was manufactured in the same manner as in Example 4, except that the amount of $FeCl_3$ coated on the surfaces of cells of the polyurethane foam was 32 parts by weight, the reaction time was 48 hrs, and the mole fraction of $FeCl_2$ to $FeCl_3$ was changed as shown in Table 5, and was measured for the electric conductivity in the same manner as in Example 4. As a result, the electric conductivity is increased by two times or more between the sample Nos. 2 and 3, and the electric conductivity is largely enhanced between the mole fractions of 0.086 and 0.143. Namely, in the case of the mole fraction of 0.143–0.288, the electric conductivity is largely enhanced by 2.58–2.82 times as much as that obtained in the case of the mole fraction of 0.086.

TABLE 5

| Sample No. | 1 | 2 | 3 | 4 |
| --- | --- | --- | --- | --- |
| $FeCl_2/FeCl_3$ (mole/mole) | 0.286 | 0.143 | 0.086 | 0.028 |
| Electric conductivity σ (S/cm) × 10$^{-4}$ | 13.7 | 12.5 | 4.85 | 4.0 |

$FeCl_3$ coated amount = 32 wt %. Time = 24 hr. Temperature = 20° C.

TABLE 6

| Sample No. | 1 | 2 | 3 | 4 |
| --- | --- | --- | --- | --- |
| $FeCl_3$ (wt %) | 32 | 40 | 80 | 140 |
| Electric conductivity σ (S/cm) × 10$^{-3}$ | 1.37 | 2 | 21.7 | 47.5 |

$FeCl_2/FeCl_3$ (mole fraction) = 0.286. Time = 24 hrs. Temperature = 20° C.

EXAMPLE 6

Each complex foam was manufactured in the same manner as in Example 4, except that the reaction time was 24 hrs, and the amount of $FeCl_3$ coated on the surfaces of cells of the polyurethane foam was in the range shown in Table 6, and was measured for the electric conductivity in the same manner as in Example 4. As a result, the electric conductivity is increased by 10 times or more between the sample Nos. 2 and 3. Accordingly, it is revealed that $FeCl_3$ in an amount of 80 parts by weight on the basis of 100 parts by weight of the polyurethane foam may be used for obtaining a large electric conductivity. Namely, in the case of $FeCl_3$ in amount of 80–140 wt %, the electric conductivity is increased by 10.9 to 23.8 times as much as that obtained in the case of $FeCl_3$ in an amount of 40 wt %.

EXAMPLE 7

Each complex foam was manufactured in the same manner as in Example 4, except that the amount of $FeCl_3$ coated on the surfaces of cells of the polyurethane foam was 140 parts by weight (in addition, $FeCl_2$ is added to $FeCl_3$), the reaction time was 24 hrs, and the reaction temperature was changed as shown in Table 7, and was measured for the electric conductivity in the same manner as in Example 4. As a result, the electric conductivity of the polyurethane foam is little changed between the temperature of 0–20° C.

Accordingly, in the case that $FeCl_2$ and $FeCl_3$ are both used as catalyst, the variation in the electric conductivity is small irrespective of the reaction temperature, and the complex foam with excellent performances can be stably manufactured, as compared with the case of using only $FeCl_3$ in Table 2.

EXAMPLE 8

Each complex foam was manufactured in the same manner as in sample No. 4 of Example 4, except that $FeCl_2$ was not used, and was measured for the electric conductivity in the same manner as in Example 4. Further, in this example, as shown in Table 8, each sample was measured for the polypyrrole complex amount and the thermal reduction rate as an indication for the thermal stability. As a result, as compared with the complex foam in this example in which $FeCl_2$ is not used, the sample No. 4 in Example 4 is high in the electric conductivity and is excellent in the thermal stability, although the produced amount of the polypyrrole is small. Therefore, it is revealed that there can be obtained the conductive polyurethane foam being further excellent in conductivity and physical properties by the addition of $FeCl_2$.

TABLE 7

| Sample No. | 1 | 2 | 3 | 4 |
|---|---|---|---|---|
| Polymerizing reaction temperature (°C.) | 0 | 5 | 10 | 20 |
| Electric conductivity σ (S/cm) × $10^{-3}$ | 6.0 | 5.8 | 5.6 | 4.75 |

$FeCl_3$ coated amount = 140 wt %. $FeCl_2/FeCl_3$ (mole fraction) = 0.286. Time = 24 hr

TABLE 8

| Example | Sample No. 4 in Example 4 | Example 8 |
|---|---|---|
| $FeCl_3$ (wt %) | 80 | 80 |
| Electric conductivity σ (S/cm) × $10^{-3}$ | 21.7 | 6.2 |
| Polypyrrole amount required for complex (wt %) (percentage based on PU foam) | 24.5 | 4.0 |
| Thermal stability (thermal reduction ratio %) 150° C. | 1.9 1.9 | 3.7 3.7 |

Time = 24 hrs. Temperature = 20° C.

Additionally, the present invention is not limited to the above-described examples, and may be variously modified within the scope of the present invention according to the purpose and the application.

What is claimed is:

1. A method of manufacturing a conductive polyurethane foam comprising the steps of:
    coating an oxidizer solution on surfaces of cells of a polyurethane foam having a plurality of open cells which are connected to each other;
    perfectly removing a solvent of said oxidizer solution by vacuum drying;
    polymerizing a compound with conjugated double bonds on the surfaces of the cells of said polyurethane foam, after said cells have been coated with said oxidizer in a vapor-phase atmosphere to form a conductive conjugated polymer layer of said compound on the oxidizer-coated surfaces of said cells; and
    dipping said polyurethane foam formed with said polymer layer in an organic solvent which does not dissolve said polyurethane foam to extract any unpolymerized portion of said compound and said oxidizer, followed by vacuum drying.

2. A method of manufacturing a conductive polyurethane foam according to claim 1, wherein said compound with conjugated double bonds comprises pyrrole N-methylpyrrole, N-ethylpyrrole, N-phenylpyrrole, 3, 5-dimethylpyrrole, 3-methoxypyrrole or 3-methyl N-methylpyrrole.

3. A method of manufacturing a conductive polyurethane foam according to claim 2, wherein said oxidizer solution contains $FeCl_2$ and $FeCl_3$.

4. A method of manufacturing a conductive polyurethane foam according to claim 3, wherein a mole ratio of $FeCl_2$ to $FeCl_3$ is in the range of 0.05–0.5 in said oxidizer solution.

5. A method of manufacturing a conductive polyurethane foam according to claim 4, wherein an amount of $FeCl_3$ coated on the surface of said polyurethane foam is in the range of 60–160 parts by weight on the basis of 100 parts by weight on the basis of 100 parts by weight of said polyurethane foam, in said oxidizer solution.

6. A method of manufacturing a polyurethane foam according to claim 3, wherein a mole fraction of $FeCl_2$ to $FeCl_3$ is in the range of 0.14–0.3, the polymerizing reaction time is in the range of 4–8 hrs, the polymerizing reaction temperature is in the range of 0–20° C. and an amount of $FeCl_3$ coated on the surface of said polyurethane foam is in the range of 60–160 parts by weight on the basis of 100 parts by weight of said polyurethane foam.

7. A method of manufacturing a polyurethane foam according to claim 2, wherein said oxidizer solution contain $FeCl_3$, and the polymerizing reaction temperature is in the range of 0–10° C.

8. A method of manufacturing a conductive polyurethane foam, which is performed by carrying a continuous foaming polyurethane foam sheet, said method comprising the steps of:
    coating an oxidizer solution on surfaces of cells of said polyurethane foam sheets, wherein said sheet has a plurality of open cells which are connected to each other;
    perfectly removing a solvent of said oxidizer solution by vacuum drying said polyurethane foam sheet coated with said oxidizer solution;
    polymerizing a compound with conjugated double bonds on the surfaces of the cells of said polyurethane foam, after said cells have been coated with said oxidizer, in a vapor-phase atmosphere to form a conductive conjugated polymer layer of said compound on the oxidizer-coated surfaces of said cells;
    dipping said polyurethane foe sheet in an organic solvent which does not dissolve said polyurethane foam to extract any unpolymerized portion of said compound and said oxidizer solution; and
    removing said organic solvent by vacuum drying said polyurethane foam sheet formed with said polymer.

9. A method of manufacturing a conductive polyurethane foam according to claim 8, wherein said compound with conjugated double bonds comprises pyrrole, N-methylpyrrole, N-ethylpyrrole, N-phenylpyrrole, 3, 5-dimethylpyrrole, 3-methoxypyrrole, 3-methyl-N-methylpyrrole.

10. A method of manufacturing a conductive polyurethane foam according to claim 9, wherein said oxidizer solution contains $FeCl_2$ and $FeCl_3$, and a mole fraction of $FeCl_2$ to $FeCl_3$ is in the range of 0.05–0.5 in said oxidizer solution.

11. A method of manufacturing a polyurethane foam according to claim 9, wherein mole fraction of $FeCl_2$ to $FeCl_3$ is in the range of 0.14–0.3, the polymerizing reaction time is in the range of 4–8 hrs, the polymerizing reaction temperature is in the range of 0–20° C., and an amount of $FeCl_3$ coated on the surface of said polyurethane foam is in the range of 60–160 parts by weight on the basis of 100 parts by weight of said polyurethane foam.

12. A method of manufacturing a polyurethane foam according to claim 9, wherein said oxidizer solution contains $FeCl_3$, and the polymerizing reaction temperature is in the range of 0–10° C.

13. A method of manufacturing a conductive polyurethane foam according to claim 1, wherein said organic solvent is methanol, ethanol, or isopropyl alcohol.

14. A method of manufacturing a conductive polyurethane foam according to claim 8, wherein said organic solvent is methanol, ethanol, or isopropyl alcohol.

* * * * *

UNITED STATES PATENT AND TRADEMARK OFFICE
CERTIFICATE OF CORRECTION

PATENT NO. : 5,591,482
DATED : January 7, 1997
INVENTOR(S) : Fei-Feng HE et al.

It is certified that error appears in the above-indentified patent and that said Letters Patent is hereby corrected as shown below:

Claim 2, col. 9, line 59, after "pyrrole" insert --,--.

Claim 5, col. 10, line 5, delete "on the basis of 100 parts by weight".

Claim 7, col. 10, line 16, change "contain" to --contains--.

Claim 8, col. 10, line 34, change "foe" to --foam--.

Claim 11, col. 10, line 56, change "FeCl$_3$coated" to --FeCl$_3$ coated--.

Signed and Sealed this

Twenty-second Day of April, 1997

*Attest:*

BRUCE LEHMAN

*Commissioner of Patents and Trademarks*

*Attesting Officer*